United States Patent [19]

Clarke

[11] E Patent Number: Re. 33,736

[45] Reissued Date of Patent: Nov. 5, 1991

[54] PERIODIC PERMANENT MAGNET STRUCTURE WITH INCREASED USEFUL FIELD

[75] Inventor: John P. Clarke, Cranford, N.J.

[73] Assignee: The United States of America as represented by the Secretary of the Army, Washington, D.C.

[21] Appl. No.: 578,177

[22] Filed: Aug. 30, 1990

Related U.S. Patent Documents

Reissue of:

[64] Patent No.: 4,731,598
Issued: Mar. 15, 1988
Appl. No.: 89,100
Filed: Aug. 24, 1987

[51] Int. Cl.[5] ..... H01F 7/00

[52] U.S. Cl. ..... 335/210; 335/306; 315/5.35

[58] Field of Search ..... 335/210, 211, 302, 301, 335/304, 306, 214

[56] References Cited

U.S. PATENT DOCUMENTS

| | | | |
|---|---|---|---|
| 3,168,686 | 2/1965 | King et al. | 335/306 |
| 4,647,887 | 3/1987 | Leupold | 335/306 |
| 4,654,618 | 3/1987 | Leupold | 335/306 X |
| 4,701,737 | 10/1987 | Leupold | 335/301 |

*Primary Examiner*—George Harris
*Attorney, Agent, or Firm*—Michael Zelenka; William H. Anderson

[57] ABSTRACT

A device is disclosed which uses permanent magnets to manipulate charged particle beams, such as those employed in traveling wave tubes, wigglers, and undulators. Tapered pole pieces are inserted between magnets in a periodic permanent magnet array, and the taper is oriented away from the beam path. The magnets themselves may also be tapered, but the taper is oriented toward the beam path. Tapering is described according to the cross sections formed when the plane which contains the beam path intersects the magnets and pole pieces.

7 Claims, 6 Drawing Sheets

PERIODIC PERMANENT MAGNET STRUCTURE WITH INCREASED USEFUL FIELD

Matter enclosed in heavy brackets [ ] appears in the original patent but forms no part of this reissue specification; matter printed in italics indicates the additions made by reissue.

The invention described herein may be manufactured, used, and licensed by or for the Government of the United States of America for governmental purposes without the payment to me of any royalties thereon.

FIELD OF THE INVENTION

The present invention relates generally to arrangements of permanent magnets and pole pieces useful in the manipulation of charged particle beams, and more particularly, to magnetic structures useful in focusing electron beams in traveling wave tubes, and in accelerating the electron beams in wigglers and undulators.

BACKGROUND OF THE INVENTION

Both electromagnets and permanent magnets have been used to manipulate beams of charged particles. In traveling wave tubes, for example, magnets have been arranged around the channel through which the beam travels to focus the stream of electrons, that is, to reduce the tendency of the electrons to repel each other and spread out. Various configurations of permanent magnets and pole pieces have been tried in an attempt to increase the focusing effect while minimizing the weight and volume of the resulting device. In conventional traveling wave tubes, permanent magnets are often arranged in a sequence of alternating magnetizations, either parallel to, or anti-parallel to, the direction of the electron flow. The magnets and pole pieces are annular in shape and their axes are aligned with the path of the electron beam. The pole pieces, constructed of ferromagnetic material such as electrolytic iron, are placed between the magnets and provide a path through which magnetic flux may leak out of the structure as well as a path through which magnetic flux from the magnets may be directed into the working space along the axis of the traveling wave tube in order to influence the beam in the desired manner.

In addition to traveling wave tubes, other devices employ magnetic structures to manipulate charged particle beams. For example, the "wiggler" and the "undulator" use a shaped magnetic field to produce electromagnetic radiation by accelerating the charged particles in directions perpendicular to the path of the beam.

One of the critical problems confronting those who develop magnetic structures used to manipulate beams of charged particles has been how to more efficiently use the magnetic materials which make up the structure. The specific problems include: how to maximize the strength of the magnetic field along the path of the charged particle beam without increasing the weight of the structure, and how to increase the amount of useful flux along the path of the beam by decreasing the percentage of leakage flux. The present invention addresses these problems.

SUMMARY OF THE INVENTION

One object of the present invention is to increase the efficiency of a magnetic structure used to manipulate a beam of charged particles.

Another object of the present invention is to increase the amount of useful magnetic flux along the path of a charged particle beam while decreasing the leakage of magnetic flux into regions away from the beam.

Another object is to increase the magnetic field along the path of a charged particle beam without increasing the weight of the magnetic structure used to manipulate the beam.

A related object is to decrease the weight of a magnetic structure used to manipulate a charged particle beam while maintaining the strength of the magnetic field along the path of the beam.

A still further object is to permit the introduction of additional magnetic material into a magnetic structure used to manipulate charged particle beams, while maintaining the total weight of the structure and increasing the strength of the magnetic field along the beam path.

These and other objects are achieved in accordance with the present invention which comprises a system of periodic permanent magnets and interposed pole pieces useful in manipulating a beam of charged particles, particularly electrons. The beam of charged particles is directed through the working space of the system, that is, the region where the magnetic field is preferentially directed. The pole pieces are tapered away from the working space, that is, cross sections of the pole pieces (in planes which contain the charged particle beam) become smaller as the distance of the cross section from the working space increases. The tapering of the pole pieces discourages saturation since the cross sectional area increases as it nears the working space. Flux leakage is also inhibited because the tapered end of the pole piece does not provide an easy path for leakage to the exterior of the structure. In addition, the tapering allows for more magnetic material to be used since the volume of the pole pieces is reduced.

BRIEF DESCRIPTION OF THE DRAWINGS

Other objects and advantages of the invention will become more fully apparent from the following detailed description when the same is considered in connection with the accompanying drawings in which.

DETAILED DESCRIPTION

Figure 1:
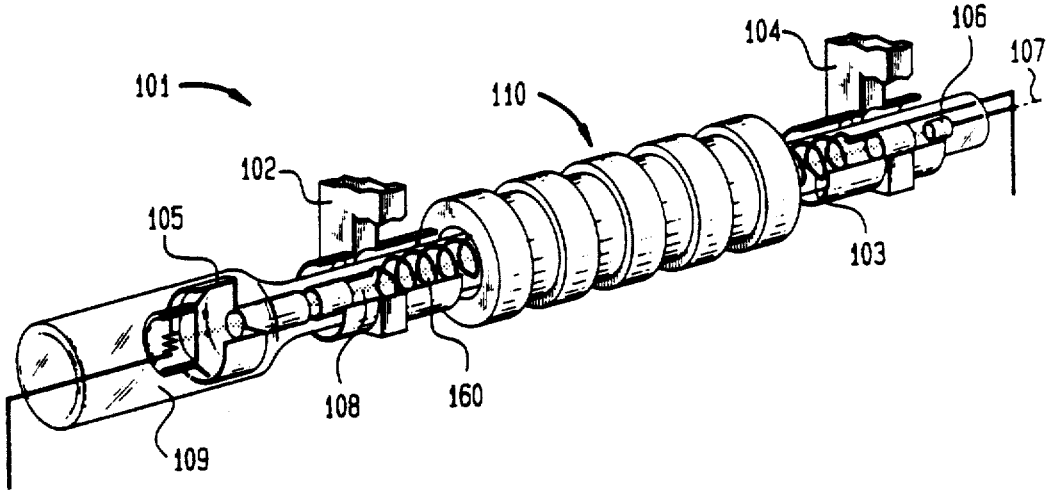
FIG. 1 (PRIOR ART)
FIG. 1 is a perspective view of an idealized conventional traveling wave tube.

FIG. 1 is a idealized view of a conventional traveling wave tube ("TWT") 101. The major components of the TWT 101 are contained within the tube body 109. An evacuated working space 160 is established within the beam focusing structure 110 along the axis 107 of the tube 101. A microwave signal is applied at the input 102 and extracted at the output 104. This signal travels through the helical structure 103, which is wrapped around the longitudinal axis 107 of the tube 101. An electron beam 108 is produced by the electron gun 105, projected down the axis 107 of the tube 101, and absorbed at the collector 106. To focus the beam 108, a beam focusing system 110 surrounds the beam 108 and the helical structure 103. The interaction between the electron beam 108 and the microwave signal produces the desired amplification of the microwave signal.

Figure 2:
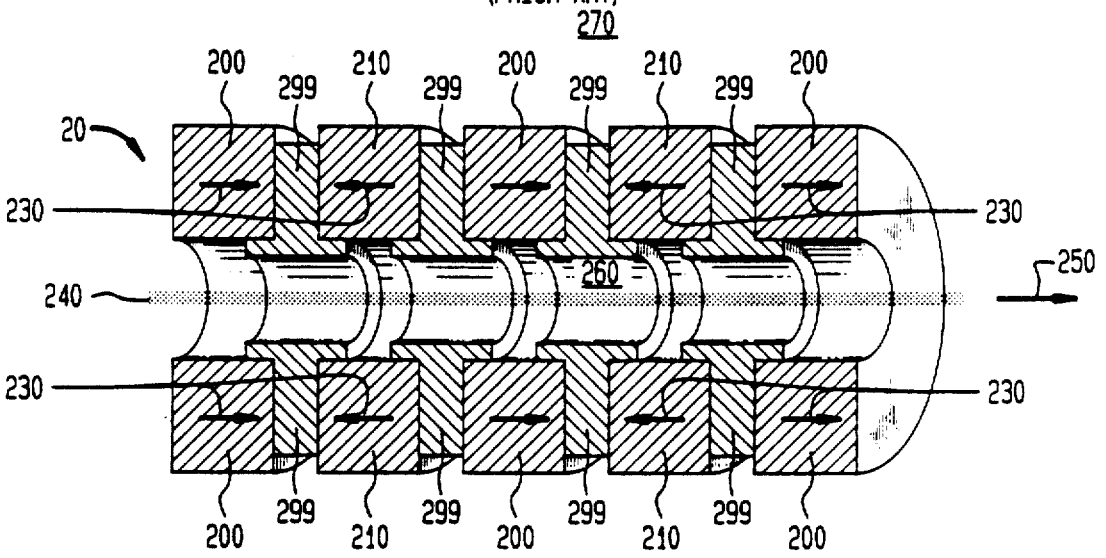
FIG. 2 (PRIOR ART)
FIG. 2 is a perspective view of a longitudinal cross section of a conventional beam focusing structure used in a traveling wave tube.
Figure 5:
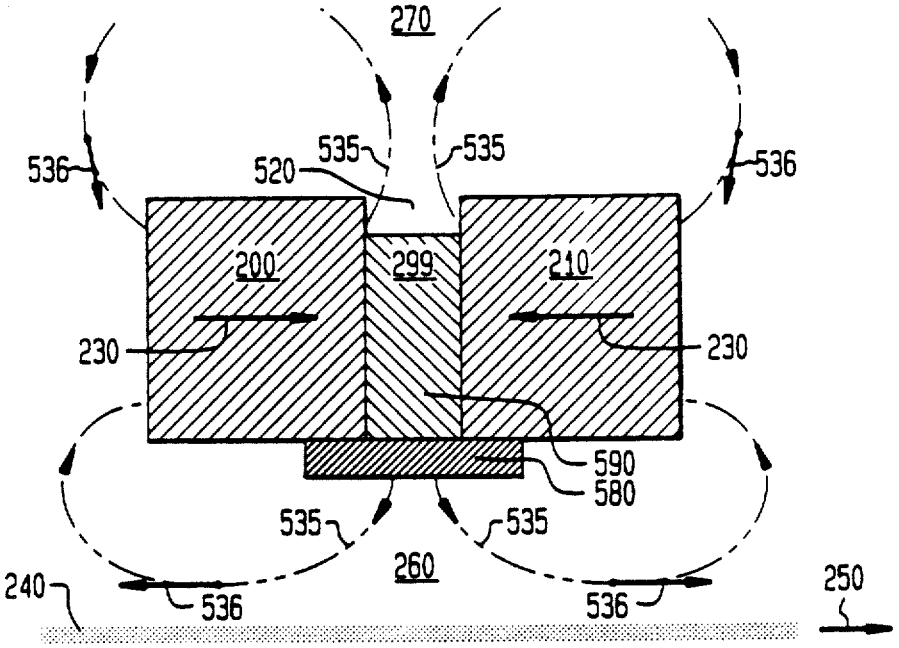
FIG. 5 (PRIOR ART)
FIG. 5 is a cross sectional view of one element of a conventional beam focusing structure used in a traveling wave tube.

FIG. 2 illustrates a longitudinal cross-section of a conventional charged particle beam focusing system 20, such as that found in a traveling wave tube. The charged particle beam 240 travels generally along a path down the axis of the cylinder in the direction indicated by the arrow 250. The working space 260 surrounds the beam path and is the region where magnetic flux is preferentially directed to focus the beam 240. Flux which flows into the external region 270 cannot contribute to the manipulation of the charged particle beam 240. To provide the magnetic flux, annular permanent magnets 200 and 210 are arranged coaxial to the charged particle beam 240 in a linear sequence with the magnetization vectors 230 oriented in the alternating pattern as shown. Magnets arranged in this alternating pattern are called "periodic permanent magnets." In between each of the successive magnets is an annular pole piece structure 299 which acts to draw magnetic flux from the magnets 200 and 210 into the working space 260. FIG. 5 shows one element of the conventional charged particle beam focusing system 20 of FIG. 2 in a cross section which includes the beam 240. A conventional pole piece structure 299 is situated between two magnets 200 and 210. Although the pole piece structure 299 is generally a single piece of ferromagnetic material, it can be thought of as having two parts, an interstitial pole piece 590, which fits between the adjacent magnets 200 and 210, and a pole face 580, which caps the interstitial pole piece 590 and protrudes into the working space 260 where it acts as a surface of equal magnetic potential. Flux travels from regions of higher magnetic potential to regions of lower magnetic potential along a multitude of paths, such as the paths illustrated as curves 535. Arrows 536 indicate the direction of the magnetic field at various points along the curves 535. Because of the cylindrical symmetry of the charged particle beam focusing system 20 of FIG. 2, the flux density within the working space 260 is substantially greater than the flux density in the external region 270. The flux which travels outside the device represents a waste of the total flux generated by the magnets 200 and 210. The function of each device would be enhanced if this flux leakage could be reduced, that is, if more useful flux could be channeled into the working space 260. A number of approaches may be taken in order to achieve this goal: increase the total flux, decrease the proportion of the total flux which leaks to the outside of the magnetic structure, or both.

In FIG. 5, the interstitial pole pieces 590 and the magnets 200 and 210 are flat rings arranged coaxially with the charged particle beam 240. The outer diameter of the interstitial pole pieces 590 is less than the outer diameter of the magnets 200 and 210, thus leaving an air gap 520 between the magnets 200 and 210 at the ends nearest the external region 270. The air gap 520 provides some resistance to the flow of flux and encourages some of the flux lines which previously would have leaked into the external region 270 to move through the interstitial pole piece 590 toward the working space 260. This diversion of flux enhances the total flux available in the working space 260 while reducing the flux leakage to the external region 270. Unfortunately, this conventional approach does not fully exploit the magnetization of that part of the magnet adjacent to the external region 270 and most removed from the working space 260.

Figure 3:
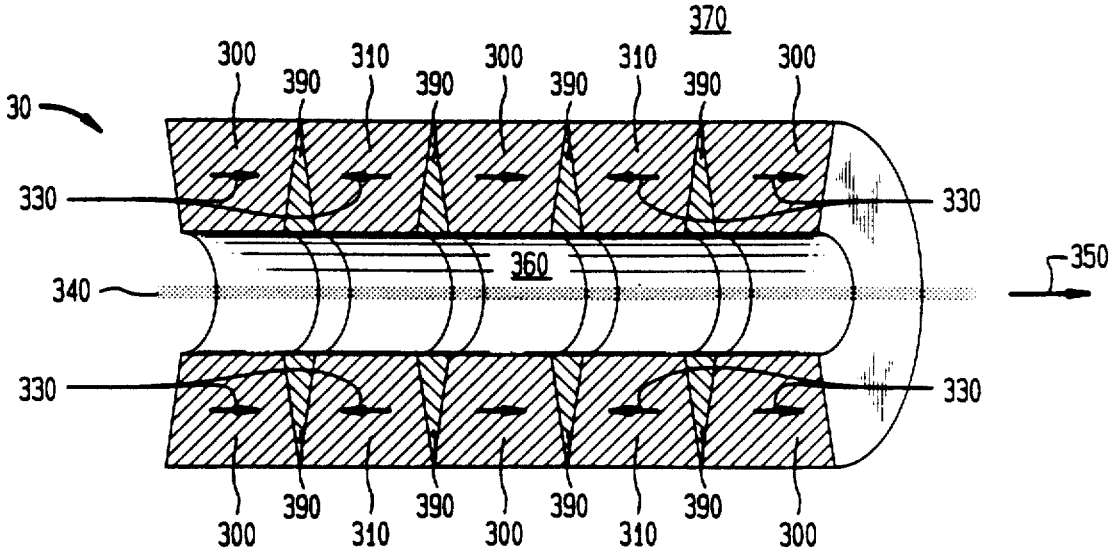
Figure 6:
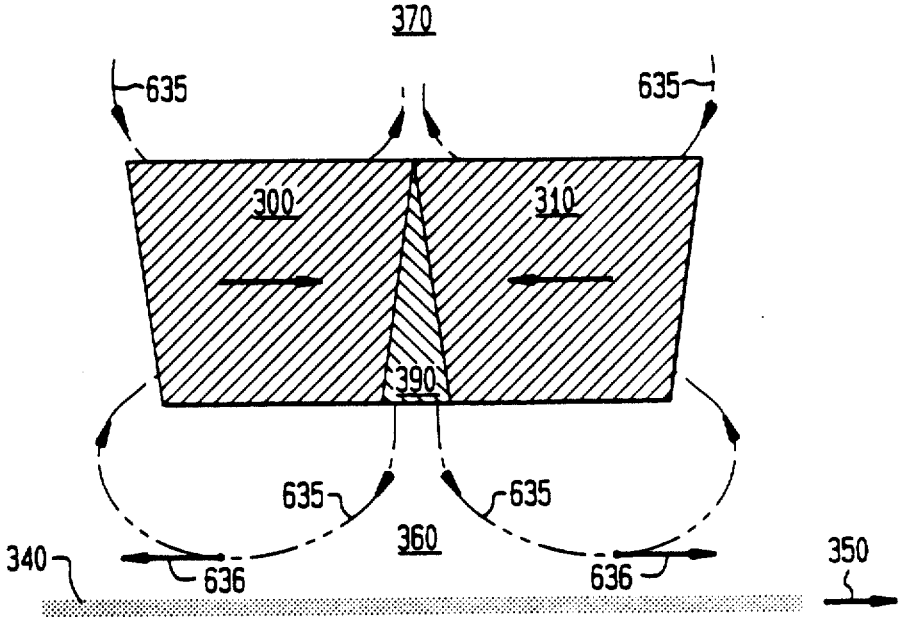
FIG. 6 is a cross sectional view of one element of a beam focusing structure in accordance with the present invention.

FIG. 3 illustrates a longitudinal cross-section of a charged particle beam focusing system 30 which employs the present invention. FIG. 6 shows one element of that charged particle beam focusing system 30 of FIG. 3 in a cross section which includes the beam 340. Both the interstitial pole piece 390 and the magnets 300 and 310 are toroidal in shape. The interstitial pole piece 390 appears in this cross-section as a triangle, while the adjacent magnets 300 and 310 appear in cross-section as trapezoids. Lines of magnetic induction are indicated by the curves 635 and the arrows 636 show the direction of the magnetic field at various points.

Figure 4:
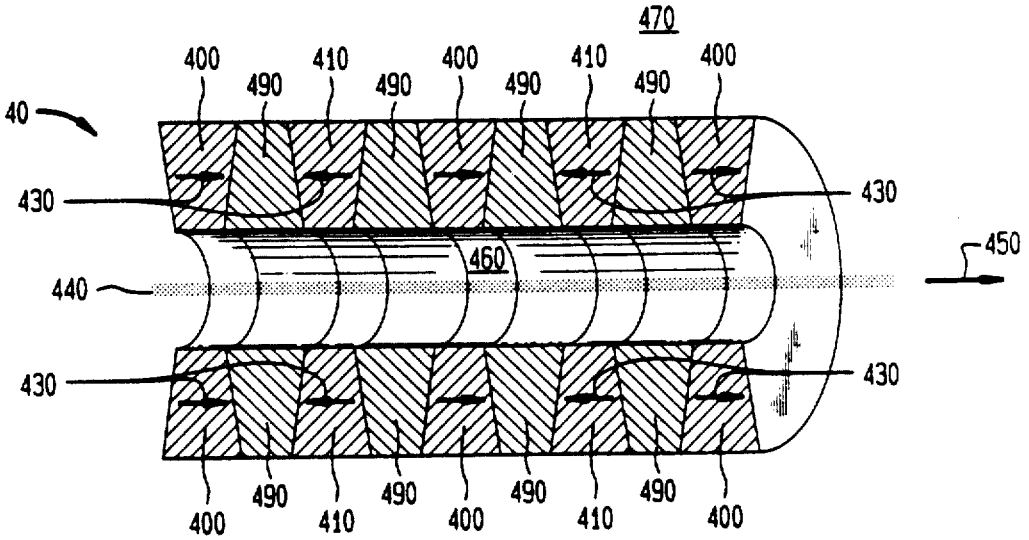
FIGS. 3 and 4 are perspective views of longitudinal cross sections of beam focusing structures in accordance with the present invention.

FIG. 4 illustrates a longitudinal cross section of a charged particle beam focusing system 40, also employing the subject invention. In this figure, both the interstitial pole piece 490 and the magnets 400 and 410 appear in cross-section as trapezoids. Whenever such a cross section is wider at one end and narrower at the other, we say that the cross section is tapered. When we speak of a cross section tapered toward a region, we mean that orientation where the narrower end is closer to the region. Conversely, when we speak of a cross section tapered away from a region, we mean that orientation where the wider end is closer to the region. Note that this definition provides for cross-sectional geometries other than triangles and trapezoids.

Tapering the pole pieces in the manner shown in FIG. 3, for example, has the following benefits: since there are no air gaps, all the flux which leaves the ends of the magnets 300 and 310 enters the interstitial pole pieces 390; because less surface area is available on the interstitial pole pieces 390 for the emergence of flux lines to the external region 370, more of the total flux is diverted into the working space 360; and, because the volume of magnetic material is greater, the total flux is increased. These benefits are achieved with no increase in the external dimensions of the device. Because the increased volume of magnetic material is achieved at the expense of pole piece material, and because the density of these materials are approximately the same, these benefits are also achieved at no increase in the weight of the device. A similar argument can be made for the tapered magnets and pole pieces of FIG. 4.

Figure 7:
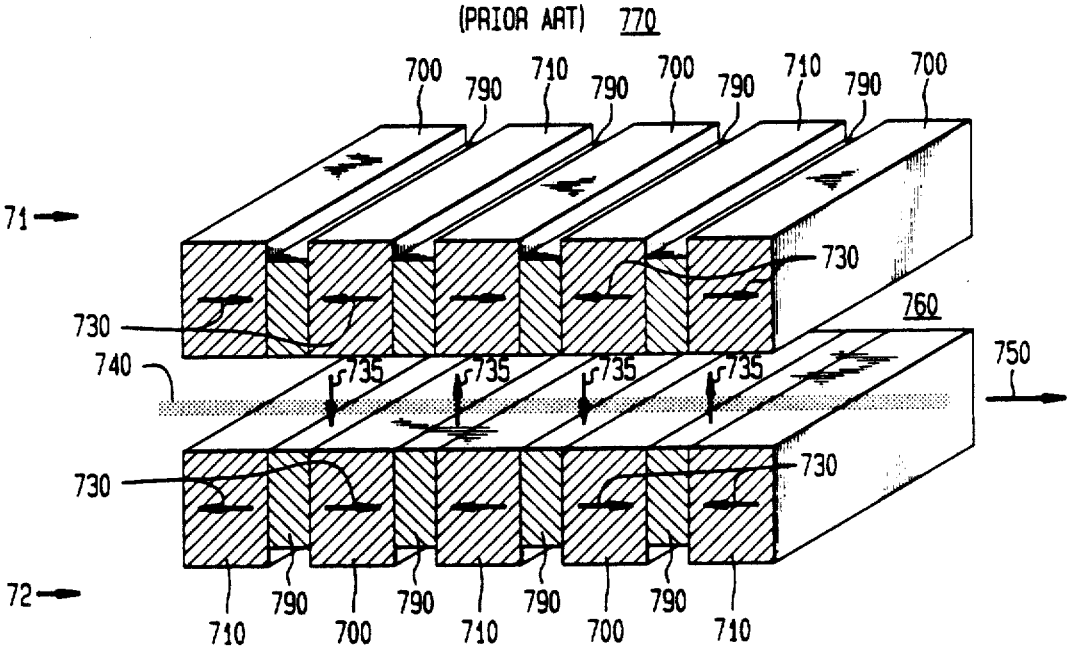
FIG. 7 (PRIOR ART)
FIG. 7 is a perspective view of a conventional wiggler.
Figure 8:
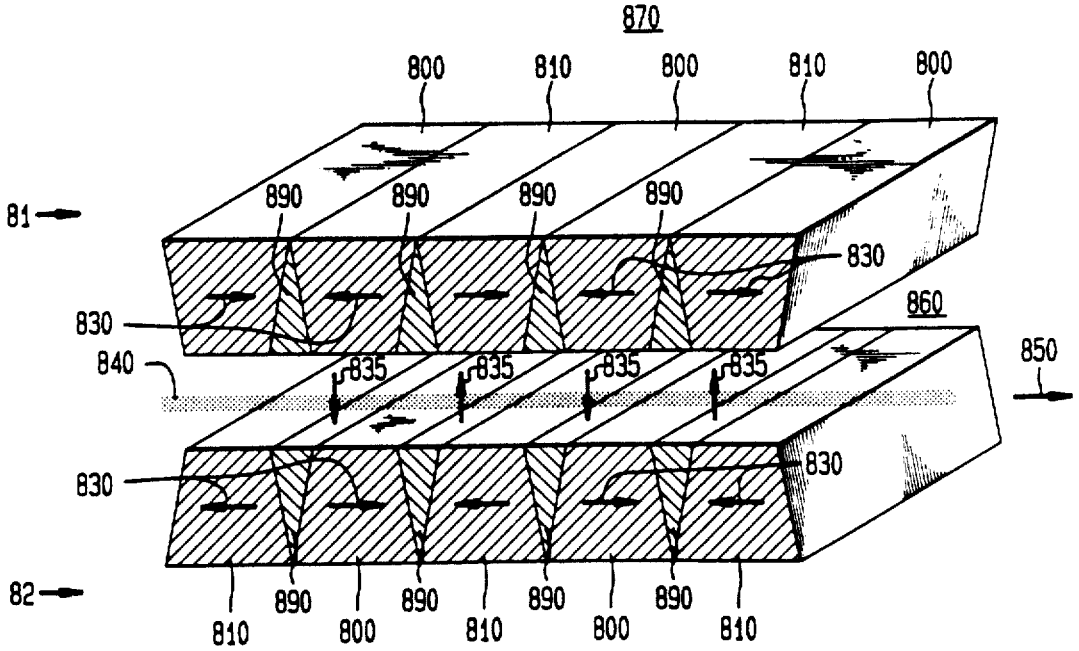
FIGS. 8 and 9 are perspective view of wigglers which employ the present invention.
Figure 9:
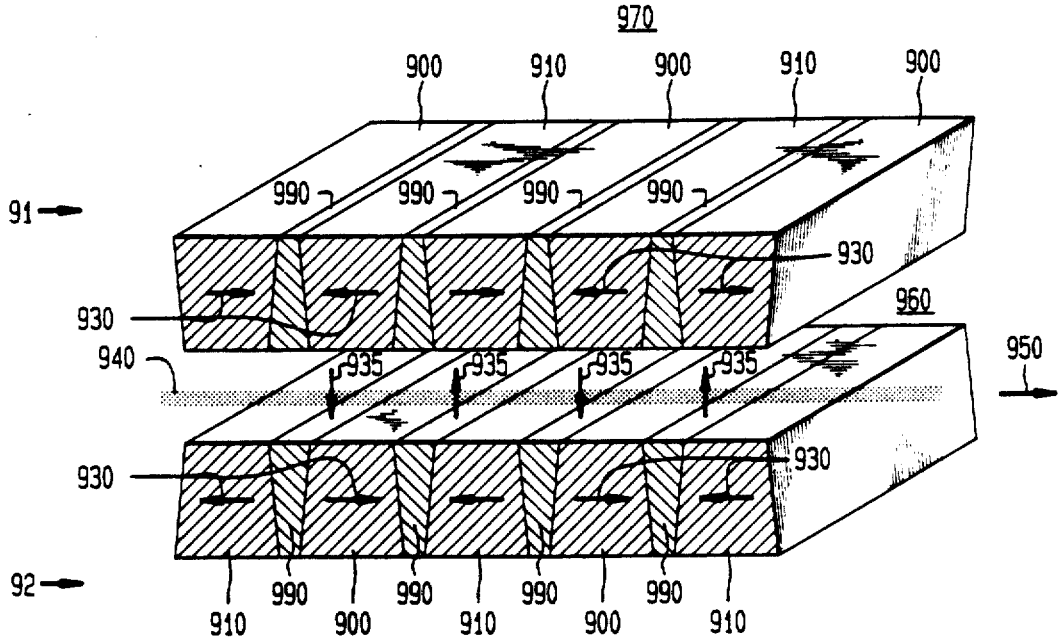

FIGS. 7, 8, and 9 illustrate variations on a so-called "wiggler" which uses magnetic fields to accelerate electrons to generate electromagnetic radiation. An "undulator" is a wiggler which produces coherent radiation.

A conventional wiggler is illustrated in FIG. 7. Two parallel planes of magnetic assemblies 71 and 72 define a channel or working space 760, through which a charged particle beam 740 flows along a path in the direction indicated by the arrow 750. The upper magnetic assembly 71 is a series of permanent bar magnets 700 and 710 separated by bar-shaped interstitial pole pieces 790. The lower magnetic assembly 72 is constructed in the same way, with the pole pieces 790 in the lower magnetic assembly 72 aligned with the pole pieces 790 in the upper magnetic assembly 71. The magnets 700 and 710 are magnetized in a direction perpendicular to their long dimensions, as indicated by magnetization vectors 730, to form a periodic permanent magnet array, where the magnetization vectors 730 are alternately parallel to and anti-parallel to the direction of flow of the charged particle beam 740. The magnetization vectors 730 in the upper magnetic assembly 71 are oriented opposite to the magnetization vectors 730 in the lower magnetic assembly 72. In an effort to reduce the flux loss to the exterior region 770, the interstitial pole pieces are recessed slightly from the exterior region 770.

The useful magnetic field in the working space 760 is indicated by the magnetic field vectors 735, which are generally perpendicular to the planes formed by the magnetic assemblies 71 and 72, and alternate periodically. Such magnetic fields cause the charged particles which make up the beam 740 to oscillate in a plane parallel to the planes formed by the magnetic assemblies 71 and 72. These oscillating charges, being accelerated, radiate electromagnetic energy in the direction of the arrow 750.

FIG. 8 shows the present invention employed in a wiggler. The cross sections of the interstitial pole pieces 890 and the permanent magnets 800 and 810, taken in planes perpendicular to the magnetic assemblies 81 and 82, exhibit the tapering in accordance with the present invention. The interstitial pole pieces 890 are tapered away from the working space 860, while the permanent magnets 800 and 810 are tapered toward the working space 860. The tapering produces the desired effects: discouraging the saturation of the pole pieces 890 close to the working space 860, inhibiting the leakage of flux into the exterior region 870, and permitting the introduction of more magnetic material into the magnets 800 and 810 without increasing the weight of the structure.

The wiggler illustrated in FIG. 9 also employs the present invention. The magnets 900 and 910 are tapered toward the working space 960 and the pole pieces 990 are tapered away from the working space 960. In this embodiment, the invention features pole pieces 990 which are trapezoidal in cross-section.

Figure 10:
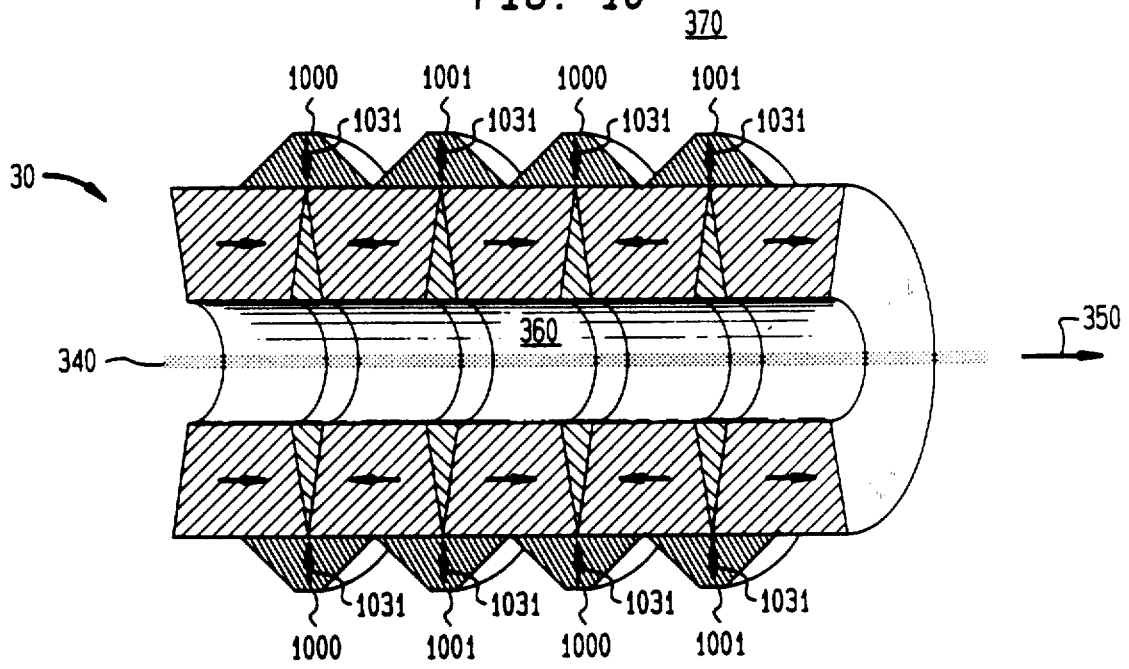
FIG. 10 is a perspective view of another beam focusing structure in accordance with the present invention; and, FIG. 11 is a perspective view of a wiggler in accordance with the present invention.

FIG. 10 illustrates the present invention used in a section of traveling wave tube. The effectiveness of the charged particle beam focusing system 30 is enhanced by the addition of cladding magnets 1000 and 1001, with the magnetization 1031, as shown. The use of such cladding magnets to improve the function of magnetic devices is taught in a number of patents, most recently, U.S. Pat. No. 4,654,618, issued Mar. 31, 1987, to Leupold, entitled "Confinement of kOe Magnetic Fields to Very Small Areas In Miniature Devices". Although the cladding magnets 1000 and 1001 add weight to the device, the portion of the magnetic flux which escapes to the exterior region 370 is greatly reduced.

Figure 11:
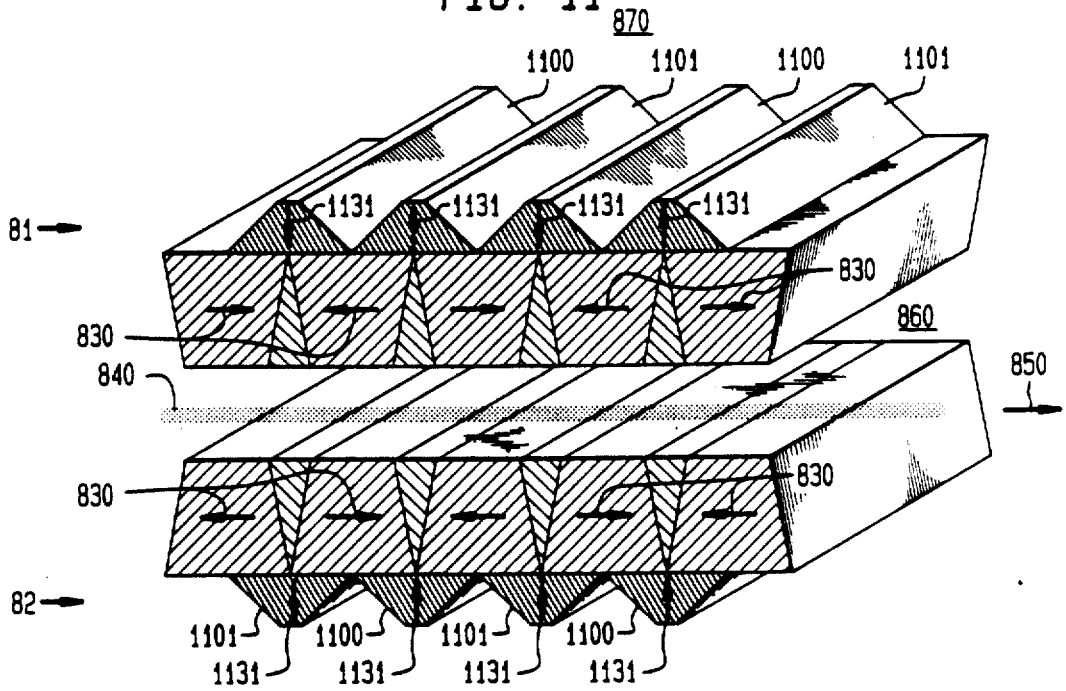

FIG. 11 illustrates the present invention used in a wiggler. As in the section of traveling wave tube described above for FIG. 10, the cladding magnets 1100 and 1101 enhance the effectiveness of the tapering.

Although the various embodiments of the present invention show triangular and trapezoidal cross sections, other geometries which exhibit tapering are possible. For example, the pole pieces and the magnets may be triangular, or trapezoidal, or with curving sides, et cetera. It should be understood, of course, that the foregoing disclosure relates to only a small number of preferred embodiments of the invention and that numerous modifications or alterations may be made therein without departing from the spirit and the scope of the invention as set forth in the appended claims.

What is claimed is:

[1. A device for manipulating a charged particle beam traveling along a beam path, said device comprising:

a pair of similar permanent magnets, one of said magnets having its magnetization aligned parallel to said beam path and in a direction opposite to the magnetization of the other said magnet;

an interstitial pole piece interposed between said magnets;

said magnets and interstitial pole piece aligned adjacent to and parallel to said beam bath; and, one said interstitial pole piece cross section, in a plane which contains said beam path, being tapered away from said beam path.]

[2. The device recited in claim 1 wherein one magnet cross section of said pair of magnets, in a plane which contains said beam path, is tapered toward said beam path.]

[3. The device recited in claim 1 wherein said pole piece is in contact with said magnets.]

[4. The device recited in claim 2 wherein said pole piece is in contact with said magnets.]

5. A device for focusing a charged particle beam along a beam path, said device comprising:

a pair of toroidal permanent magnets, of substantially equal inner diameter and substantially equal outer diameter, having their axes aligned along said beam path;

one of said magnets having its magnetization oriented parallel to said beam path and in the direction opposite to that of the other said magnet;

a toroidal interstitial pole piece, of said inner diameter and said outer diameter, interposed between said toroidal permanent magnets, and having its axis aligned with said beam path; and, one said pole piece cross section, in a plane containing said beam path, being tapered away from said beam path.

6. The device recited in claim 5 wherein:

one magnet cross section of said pair of magnets, in a plane containing said beam path, is tapered toward said beam path.

7. The device recited in claim 5 wherein said pole piece is in contact with said magnets.

8. The device recited in claim 6 wherein said pole piece is in contact with said magnets.

[9. A device for producing electromagnetic radiation by transversely accelerating a beam of charged particles traveling along a beam path, said device comprising:

a pair of similar permanent bar magnets, said magnets lying in a plane adjacent to and parallel to said beam path;

one of said magnets having its long dimension parallel to the long dimension of the other magnet;

one of said magnets having its magnetization parallel to said beam path and in the opposite direction to the magnetization of the other magnet;

a bar-shaped pole piece interposed between the said pair of magnets, said pole piece lying in said plane of said pair of magnets;

one said pole piece cross section, in a plane containing said beam path, being tapered away from said beam path.]

[10. The device recited in claim 9 wherein one magnet cross section of said pair of magnets, in a plane containing said beam path, is tapered toward said beam path.]

[11. The device recited in claim 9 wherein said pole piece is in contact with said magnets.]

[12. The device recited in claim 10 wherein said pole piece is in contact with said magnets.]

[13. A device for producing electromagnetic radiation by transversely accelerating a beam of charged particles traveling along a beam path, said device comprising:

a first pair of similar permanent bar magnets;

one magnet of said first pair of magnets having its long dimension parallel to the long dimension of the other magnet of said first pair of magnets;

one magnet of said first pair of magnets having its magnetization perpendicular to its long dimension, in the plane formed by the long dimensions of said first pair of magnets, and in the opposite direction to the magnetization of the other magnet of said first pair of magnets;

a first bar-shaped pole piece interposed between the said first pair of magnets, said first pole piece having its long dimension in the plane formed by the long dimensions of said first pair of magnets and parallel to the long dimension of one of said first pair of magnets;

a second pair of permanent bar magnets similar to said first pair of magnets;

one magnet of said second pair of magnets having its long dimension parallel to the long dimension of the other magnet of said second pair of magnets, said long dimensions of said second pair of magnets lying in a plane parallel to the plane formed by said long dimensions of said first pair of magnets;

one magnet of said second pair of magnets having its magnetization perpendicular to its long dimension, in the plane formed by the long dimensions of said second pair of magnets, and in the opposite direction to the magnetization of the other magnet of said second pair of magnets;

a second bar-shaped pole piece interposed between the said second pair of magnets, said second pole piece having its long dimension in the plane formed by the long dimensions of said second pair of magnets and parallel to the long dimension of one of said second pair of magnets;

one magnet of said first pair of magnets having its long dimension lying in the same plane as the long dimension of one magnet of said second pair of magnets, said plane being perpendicular to the plane formed by the long dimensions of said first pair of magnets;

said beam path lying between the plane formed by the long dimensions of said first pair of magnets and the plane formed by the long dimensions of said second pair of magnets, said path being parallel to the magnetization of one of said first pair of magnets;

said first pole piece cross section, in a plane containing said beam path, being tapered away from said beam path; and, said second pole piece cross section, in a plane containing said beam path, being tapered away from said beam path.]

[14. The device recited in claim 13 wherein one cross section of one magnet of said first pair of magnets, in a plane containing said beam path, is tapered toward said beam path; and, one cross section of one magnet of said second pair of magnets, in a plane containing said beam path, is tapered toward said beam path.]

[15. The device recited in claim 13 wherein said first pole piece is in contact with said first pair of magnets; and, said second pole piece is in contact with said second pair of magnets.]

[16. The device recited in claim 14 wherein said first pole piece is in contact with said first pair of magnets; and said second pole piece is in contact with said second pair of magnets.]

17. A periodic permanent magnet structure comprising a plurality of toroidal permanent magnets each having the same predetermined inner and outer diameters and aligned with respect to a common axis and a plurality of interstitial toroidal pole pieces having said predetermined inner and outer diameters and being axially aligned with said magnets, each of said pole pieces being wedged between a pair of magnets and in intimate contact therewith, said pole pieces being tapered in a direction away form said common axis with the thickness or width of the same decreasing with increasing radial distance.

18. A periodic permanent magnet structure as defined in claim 17 wherein each of said pole pieces has a triangular cross section.

19. A periodic permanent magnet structure as defined in claim 17 wherein each of said pole pieces has a trapezoidal cross section.

* * * * *